United States Patent
Peters (10) Patent No.: US 11,975,697 B2
(45) Date of Patent: May 7, 2024

(54) MODULAR AUTONOMOUS SYSTEM FOR VEHICLE MAINTENANCE, REPAIR AND RELATED METHOD

(71) Applicant: Mallar A. Peters, Philadelphia, PA (US)

(72) Inventor: Mallar A. Peters, Philadelphia, PA (US)

( * ) Notice: Subject to any disclaimer, the term of this patent is extended or adjusted under 35 U.S.C. 154(b) by 0 days.

(21) Appl. No.: 18/230,110

(22) Filed: Aug. 3, 2023

(65) Prior Publication Data

US 2023/0373447 A1 Nov. 23, 2023

Related U.S. Application Data

(63) Continuation-in-part of application No. 18/096,470, filed on Jan. 12, 2023, now abandoned.

(60) Provisional application No. 63/298,643, filed on Jan. 12, 2022.

(51) Int. Cl.
| | |
|---|---|
| *B60S 5/00* | (2006.01) |
| *B23P 6/00* | (2006.01) |
| *B25J 11/00* | (2006.01) |
| *B25J 15/00* | (2006.01) |
| *B33Y 30/00* | (2015.01) |

(52) U.S. Cl.
CPC . *B60S 5/00* (2013.01); *B23P 6/00* (2013.01); *B23P 2700/50* (2013.01); *B25J 11/005* (2013.01); *B25J 11/0075* (2013.01); *B25J 15/0052* (2013.01); *B33Y 30/00* (2014.12); *Y10T 29/49718* (2015.01); *Y10T 29/49746* (2015.01)

(58) Field of Classification Search
CPC .......... B60S 5/00; B23P 6/00; B23P 2700/50; Y10T 29/4971; Y10T 29/4974; B25J 11/005; B25J 11/0075; B25J 15/0052
See application file for complete search history.

(56) References Cited

U.S. PATENT DOCUMENTS

| | | | | |
|---|---|---|---|---|
| 4,987,973 | A * | 1/1991 | Cody | F16N 31/002 184/106 |
| 7,874,057 | B1 * | 1/2011 | Rickards | B25H 5/00 29/430 |
| 10,604,956 | B1 * | 3/2020 | Hartschuh | B60C 25/0512 |
| 11,293,314 | B1 * | 4/2022 | Eisenbach | B60S 5/00 |
| 2007/0067075 | A1 * | 3/2007 | McMillan | G01N 21/88 701/31.4 |
| 2009/0165276 | A1 * | 7/2009 | Giarrizzo, Jr. | B60S 13/00 29/402.08 |

(Continued)

FOREIGN PATENT DOCUMENTS

WO WO-2019018611 A1 * 1/2019 ............. B60L 53/30

*Primary Examiner* — Jermie E Cozart
(74) *Attorney, Agent, or Firm* — Gary P. Topolosky (57) ABSTRACT

The present invention in its embodiment is a Modular Autonomous System for vehicle maintenance and repairs. The system is built around a base unit, with slots for individual modular service units. The system autonomously carries out tire changes, oil changes, cosmetic detailing, fluid replacements, tire balancing, tire rotations, mechanical parts replacement/removal, mechanical parts printing, paint applications, and vehicle diagnostics. The system is designed to operate in auto dealer service bays, tire shops, paint/cosmetic detailing shops, full service centers, home garages, and any location with access to electricity. A method of use is also disclosed.

15 Claims, 13 Drawing Sheets

(56) References Cited

U.S. PATENT DOCUMENTS

| | | | | |
|---|---|---|---|---|
| 2016/0052758 A1* | 2/2016 | Roberson | ............... | B60P 3/14 |
| | | | | 187/244 |
| 2019/0100420 A1* | 4/2019 | Perlstein | ............... | G05G 23/00 |
| 2019/0337167 A1* | 11/2019 | Clifford | ............... | B05B 12/14 |
| 2021/0114408 A1* | 4/2021 | Darolfi | ............... | B60B 29/00 |
| 2021/0347058 A1* | 11/2021 | Chalofsky | ............ | B60C 25/0548 |

\* cited by examiner

MODULAR AUTONOMOUS SYSTEM FOR VEHICLE MAINTENANCE, REPAIR AND RELATED METHOD

CROSS-REFERENCE TO RELATED APPLICATIONS

This application is a continuation-in-part of U.S. application Ser. No. 18/096,470, filed on Jan. 12, 2023, which was a perfection of U.S. Provisional Patent Application Ser. No. 63/298,643, filed on Jan. 12, 2022, both disclosures of which are fully incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

(1) Field of the Invention

The present invention is in the field of Autonomous and Semi-Autonomous vehicle maintenance and repair systems.

(2) Description of the Related Art

In the auto-services and repair industry the carrying out of various kinds of vehicle maintenance and servicing operations can be a time consuming, dangerous, expensive, and challenging process. It can be equally as difficult to find qualified technicians with the appropriate skills and experience to do more technical services. The current auto repair equipment market offers systems that can partially assist in the removal, replacement, and changing of tires, but largely neglects all other maintenance and servicing needs.

As vehicles become more advanced and incorporate novel technologies this will further widen the availability gap of affordable, quality, and timely services. It is therefore desirable to have substantial improvements to vehicle maintenance and repair equipment.

(2) Description of Related Art Including Information Disclosed Under 37 CFR 1.97 and 1.98

None.

BRIEF SUMMARY OF THE INVENTION

The invention in discussion is an autonomous, modular, vehicle maintenance and repair system. The system is comprised of a modular base unit and various repair/service modules that can be individually purchased and rapidly installed into the base unit by customers based on needs. The modules are designed to be easily installed into prefabricated hardware slots on the base unit and enabled via software upgrade.

The modules consist of, but are not limited to:

A Tire Control Module (TCM) that removes, changes, replaces, rotates, inflates, deflates, and details a tire/rim assembly. The module also consists of 16 tire retrieval posts that store new and old tires primarily used during new tire installation.

An Oil Change Module (OCM) that removes/replaces oil pan screws, replaces oil, and removes/replaces oil filters. The module is also capable of replacing various automotive fluids to include but not limited to, radiator fluid, power steering fluid, engine oil, anti-freeze, windshield wiper fluid, transmission fluid, etc.

A Paint and Cosmetic Detailing Module (PAM/CDM) that applies various waxes, protective coatings, and paint.

A Mechanical Parts Removal and Replacement Module (MPRRM) that removes/replaces mechanical parts. The module also consists of a mechanical parts printer module that fabricates new parts.

A Base Unit (BU) that consists of a vehicle lift, tire balancer, and prefabricated hardware slots for modules. The Base Unit also consists of a diagnostic tablet that sends and receives data between the vehicles on board computer and the Base Units computer. The diagnostic tablet analyzes what repairs are needed, suggest repairs to the system operator, and sends signals to the Base Unit to carry out maintenance/repair services.

The system is designed to operate all modules autonomously after receiving data from the vehicles onboard computers and suggesting command instructions to a user. The appropriate service operations are communicated to the modules via the Base Units computer and executed individually or simultaneously depending on order of operations. This allows for rapid, reliable, full-service maintenance, significantly reduced costs, lower wait times, improved operational efficiency, and boosted profits.

A method for using such a system for vehicular maintenance/repair is also disclosed.

BRIEF DESCRIPTION OF THE SEVERAL VIEWS OF THE DRAWING(S)

To assist those of skill in the art in making and using the disclosed invention and associated methods, reference is made to the accompanying figures, wherein.

DETAILED DESCRIPTION OF THE INVENTION

The present invention provides a unique vehicle maintenance and repair system, enabling autonomous servicing of vehicles on a more robust level. The new system incorporates a modular base unit consisting of a vehicle lift, a tire balancer, a diagnostic tool, and prefabricated slots for individual service modules to be installed into the base unit. This design feature allows for rapid upgradeability and customization of services performed via the modules. The individual service modules are enabled via software upgrade and become fully functional thereafter. The present invention is described in enabling detail in the following examples, which may represent more than one embodiment of the present invention.

Please note that in the accompanying drawings, the overall "system" shows various embodiments of mechanical parts modules, oil change modules and paint application modules situated between the tire tracks of a base unit having one or more (four are shown in some views) individualized tire control modules. It is to be understood that the essence of this invention is meant to address multiple variations in which the end user/customer may pick and choose between the inclusion of one, two, three or all modules for use in their fully autonomous maintenance and repair service system of the future, all computer controlled by a common system control unit with an I-pad sized touchscreen control affixed (permanently or temporarily) to a main corner post of the unit.

Figure 1:
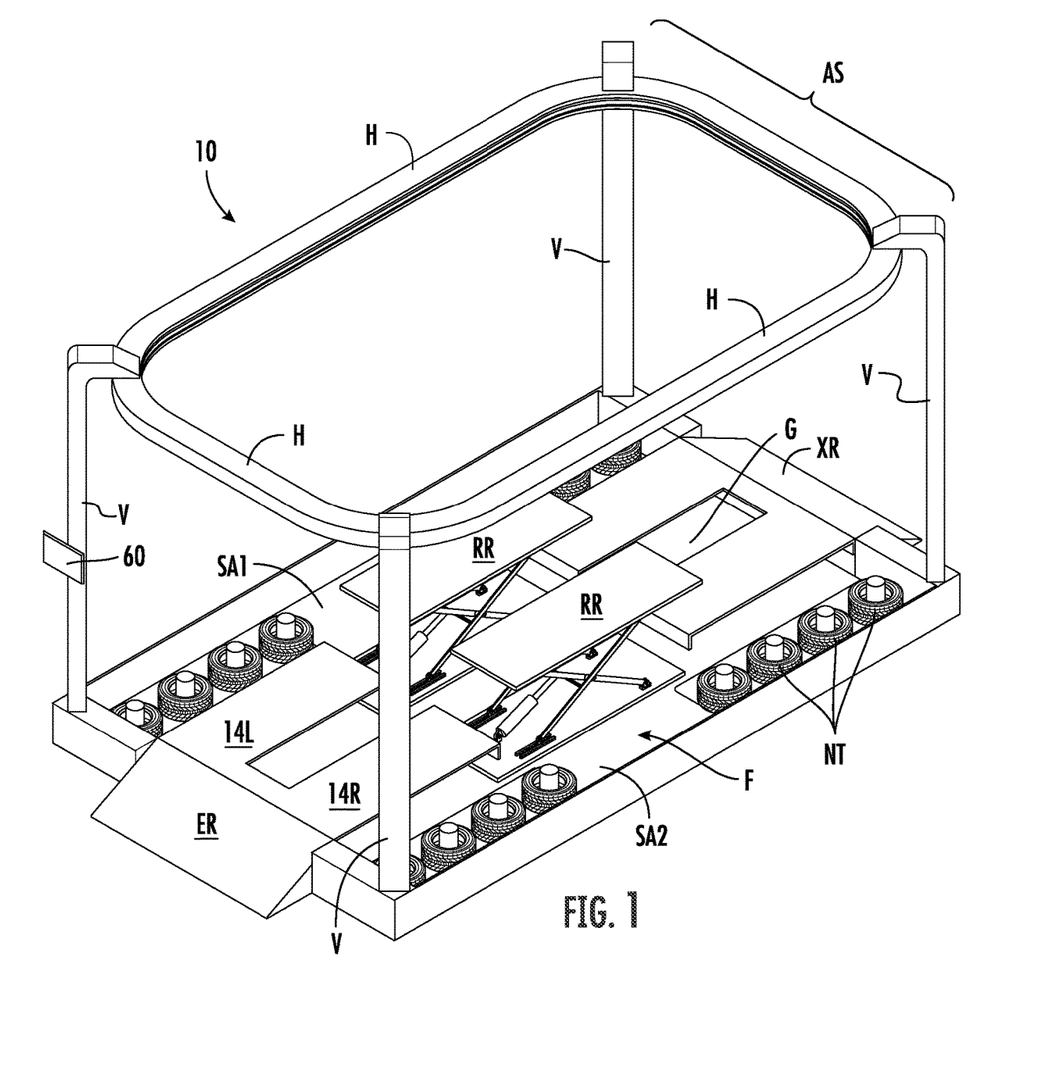
FIG. 1 is a front corner perspective view of the base unit of the system about which various modules may be hung, or otherwise installed to build the vehicle maintenance and repair system of this invention.

FIG. 1 is a perspective view of one preferred embodiment of base unit, generally 10, consisting of a mostly rectangular, tubular frame with 3 or more vertical posts V, horizontal connector bars H between and a master floor F configuration. The latter floor F includes one or more entry ramps ER (one is shown), and two tire ramps 14L, 14R that can be spread apart a preferred gap G depending on the vehicle being driven thereon for servicing with the present invention. An optional exit ramp XR is shown at the far end of base unit 10.

Beneath the tire ramps 14L, 14R, there are ramp raisers RR (or lifts). The raisers can be scissor types, pneumatic, or of numerous other known, or subsequently developed varieties. The raisers should be separate from one another as, depending on the module units connected to base unit 10, there may be need to spread ramps 14L, 14R as far from each other so that one or more components of a given module may be positioned between same.

Lastly, base unit 10 should have some storage areas SA1, SA2, to the left and/or right of ramps 14L, 14R for the storage of module components when not in use—or for the storage of items/parts to-be-installed on a given vehicle. Examples of the latter include: new tires NT, various filters and/or mechanical parts like struts, control arms, etc.

Figure 2:
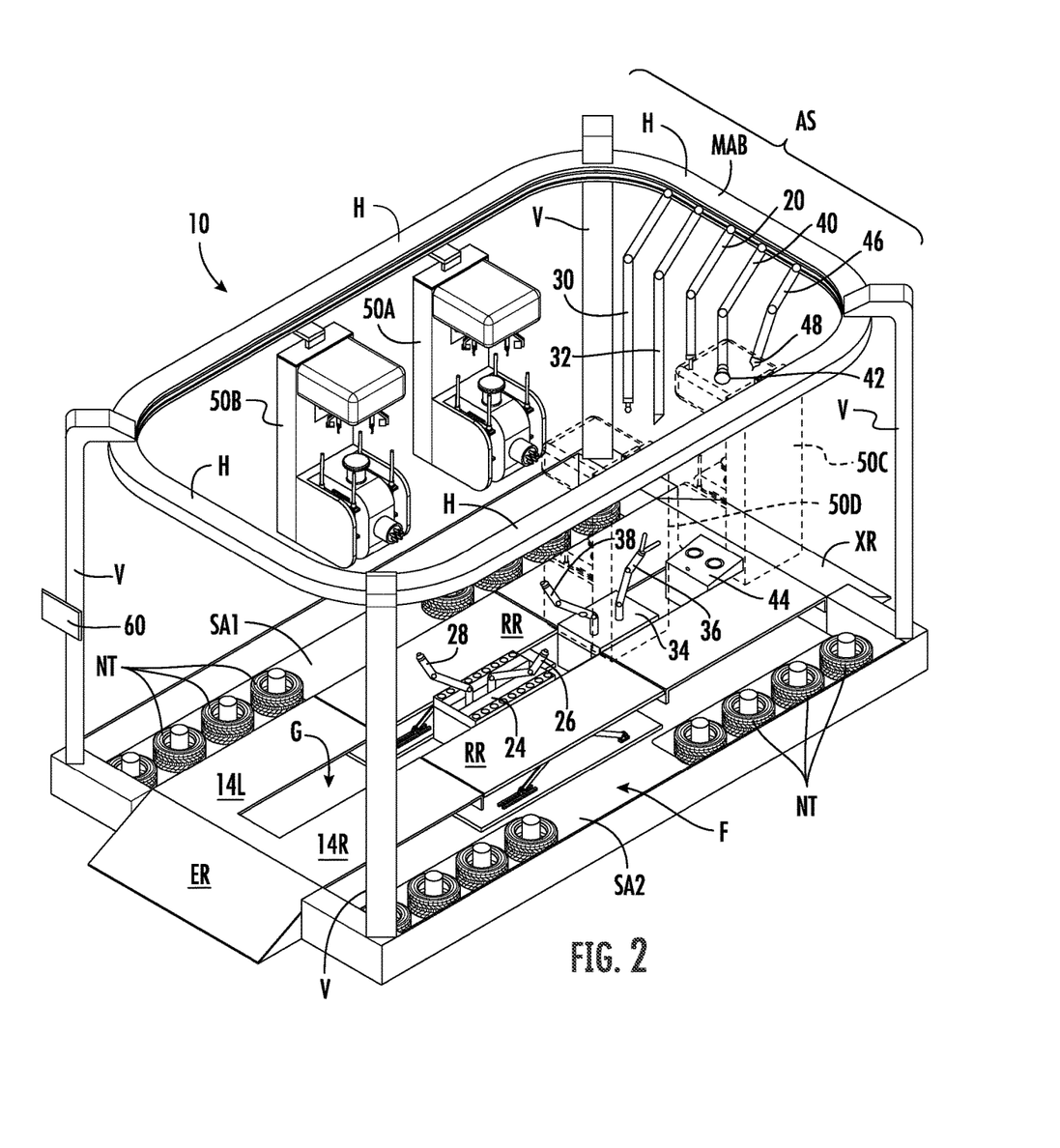
FIG. 2 is a top perspective view of one preferred embodiment having a tire control module, paint/cosmetic detail application module, mechanical parts application module, oil change module and tire posts surrounding a centrally located base unit.

FIG. 2 is a first embodiment of autonomous system AS with its base unit 10, vertical posts V (right side tire control modules dotted for illustration purposes) and series of top horizontal connector bars H. The most rearward of these bars, main module arm bar MAB, has a plurality of module arms connected thereto—for extending downwardly therefrom, for use as needed by the autonomous system AS to perform services on a vehicle driven into the workstation. Though not limited to size, style or relative locations, the arms depicted as extending from left-to-right on module arm bar MAB include: a pair of mechanical parts module MPRRM tool arms 30, 32, each showing a representative tool head connected to a lower arm thereof; an oil change module OCM servicing arm 20; and a pair of paint/detailing module PAM/CDM arms 40, 46, one having a representative spray head 48 and the other a sander 42 at their lower ends.

In the autonomous system AS of FIG. 2, there is also shown corresponding, undercarriage module components situated between the spaced apart tire ramps 14L, 14R of base unit 10. Particularly, there is positioned a floor unit component 34 for mechanical parts module MPRRM with one or more (two shown) rotatable, extendable arms 36, 38 operable therefrom. Next to that is a floor unit component 24 of oil change module OCM, the latter being shown with its own pair of operable, oil changing service arms 28, 26. Lastly, there is a corresponding floor unit component 44 for PAM/CDM module.

In FIG. 2, the tire control module can be moved about its base unit 10 along motor driven tracks (not shown). This allows for various positions of the module during operations and for tire rotations. Control arms (not shown) for tire changing module TCM may be used to, among other responsibilities, assess tire size, relative lug nut locations, and adjust mechanical guide rods and a fastener apparatus to better grab the vehicle tire when removing the old tire and/or securing the newly mounted replacement tire thereto.

For the typical tire station of the tire control module TCM, a removed tire and rim is first rotated up into a position where the first (or old) tire can be mechanically separated from the rim. The old tire is then transferred to an optional tire retrieval station for subsequent recycling (or disposal). A new tire is then selected and transferred to a tire control arm or its equivalent for using the tire station to install the new tire on its rim, inflated and rotated for proper positioning, and subsequent reinstalling on the vehicle. After the new tire is reinstalled, an autonomous tire balancer (not shown) is activated. Note that ideally, each individual tire control module will most likely include its own machine vision cameras, mechanical rods/sockets, grab arms, rollers, bead breakers, lubricators, and air pressure inflation/release mechanisms per the present invention.

To the left front vertical post V of base unit 10 for FIG. 2, there is shown a user interface computer module 60, sized as small as a removable, transportable I-pad, from which a system operator controls which modules to program for performing which services ON the particular vehicle driven into the base unit 10 of this autonomous system AS. From this module 60, an operator may be able to start or stop specific service operations, cancel/redo operations, enter customer/vehicle information, or make software upgrades as needed.

Though not expressly shown in accompanying FIG. 2, it is anticipated that each autonomous system AS covered by the present invention may include one or more of: a vehicle lift, installed tire balancer, machine vision cameras, on board computer, electrical wiring, motor driven tracks and a user command interface. Each autonomous system AS may further include prefabricated slots for the addition of new modules and/or existing module upgrades.

Figure 3A:
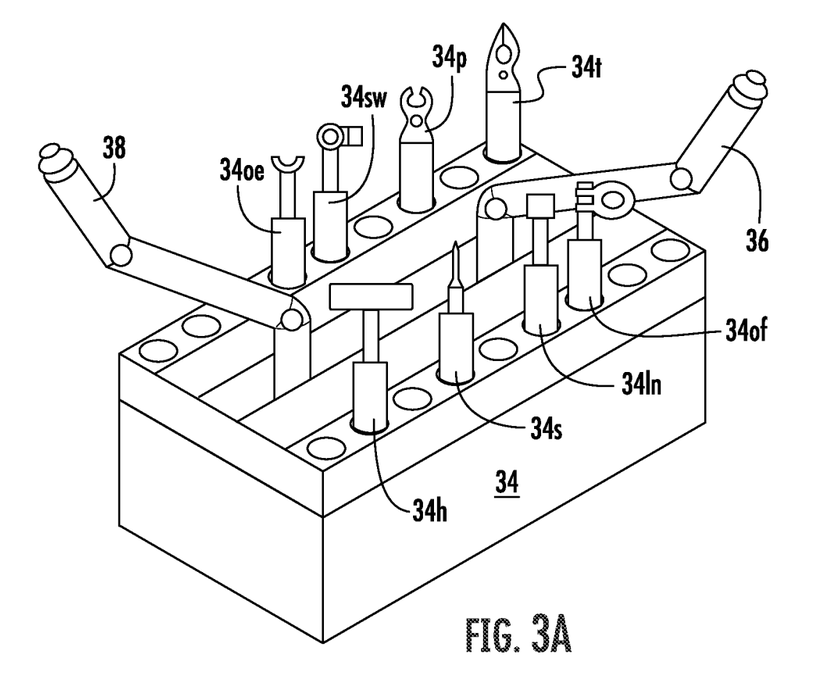
FIG. 3A is a closeup perspective view showing a section of the mechanical parts module with its robotic arms extending upwardly and various tool types accessible for use therewith.
Figure 3B:
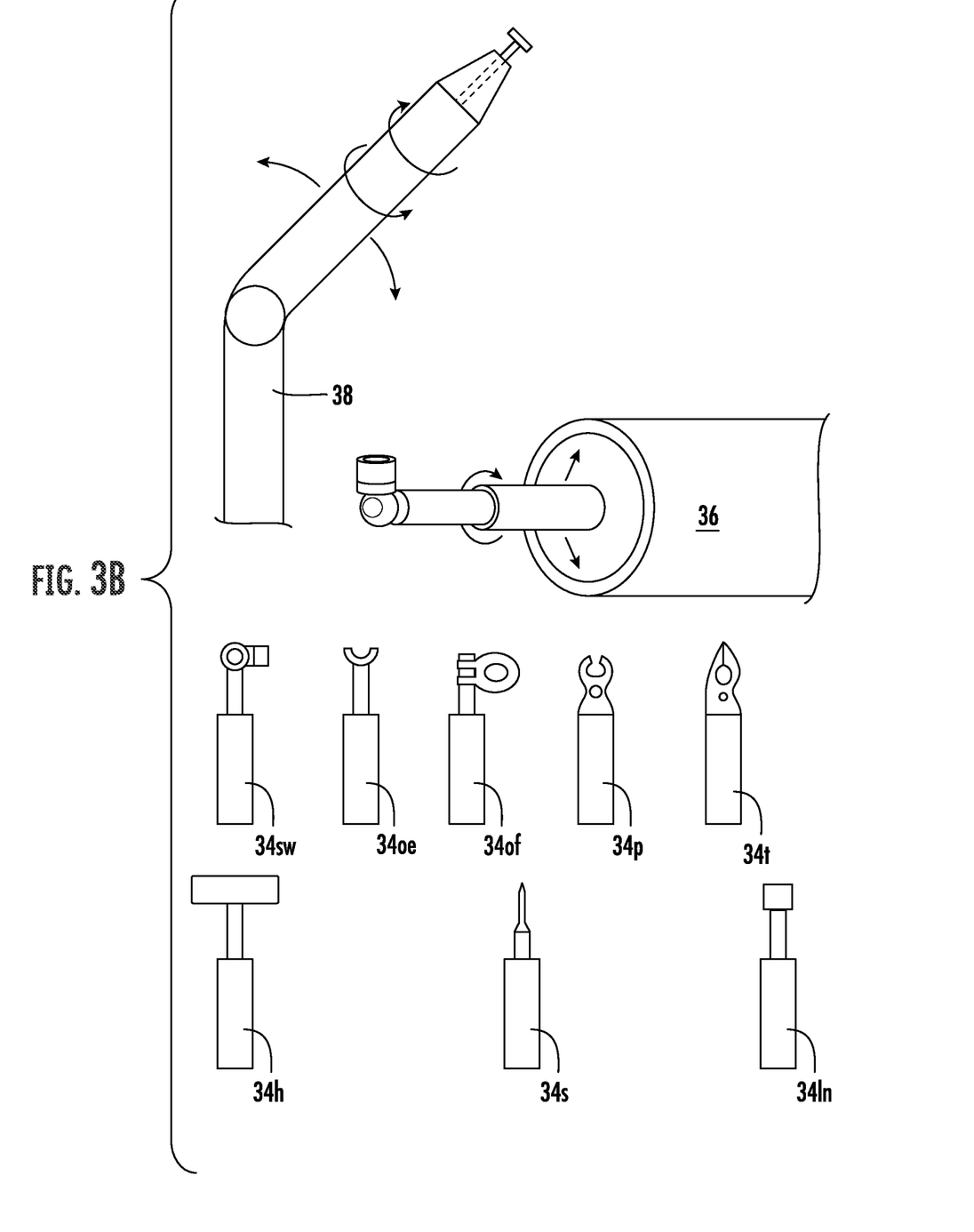
FIG. 3B is a closeup perspective view showing one of the robotic arms from the mechanical parts module with some representative types of tool tips usable therewith.

FIG. 3A shows a representative mechanical parts module MPRRM that includes a floor unit component 34 with tool arms 36, 38. FIG. 3B shows the rotatable end of one of these tool arms above a depiction of eight representative tool tips for use therewith including: a socket wrench 34*sw*, standard open-end wrench 34*oe*, an adjustable oil filler wrench 34*of*, pliers 34*p*, tweezers 34*t*, piston hammer 34*h*, screwdriver 34*s* and lug nut remover 34*ln*. Though not shown, preferred mechanical parts modules MPRRM may be partnered with one or more miniaturized CNC printers to fabricate, on site and as-needed, mechanical parts for installation on the vehicle in the autonomous system AS.

Figure 4A:
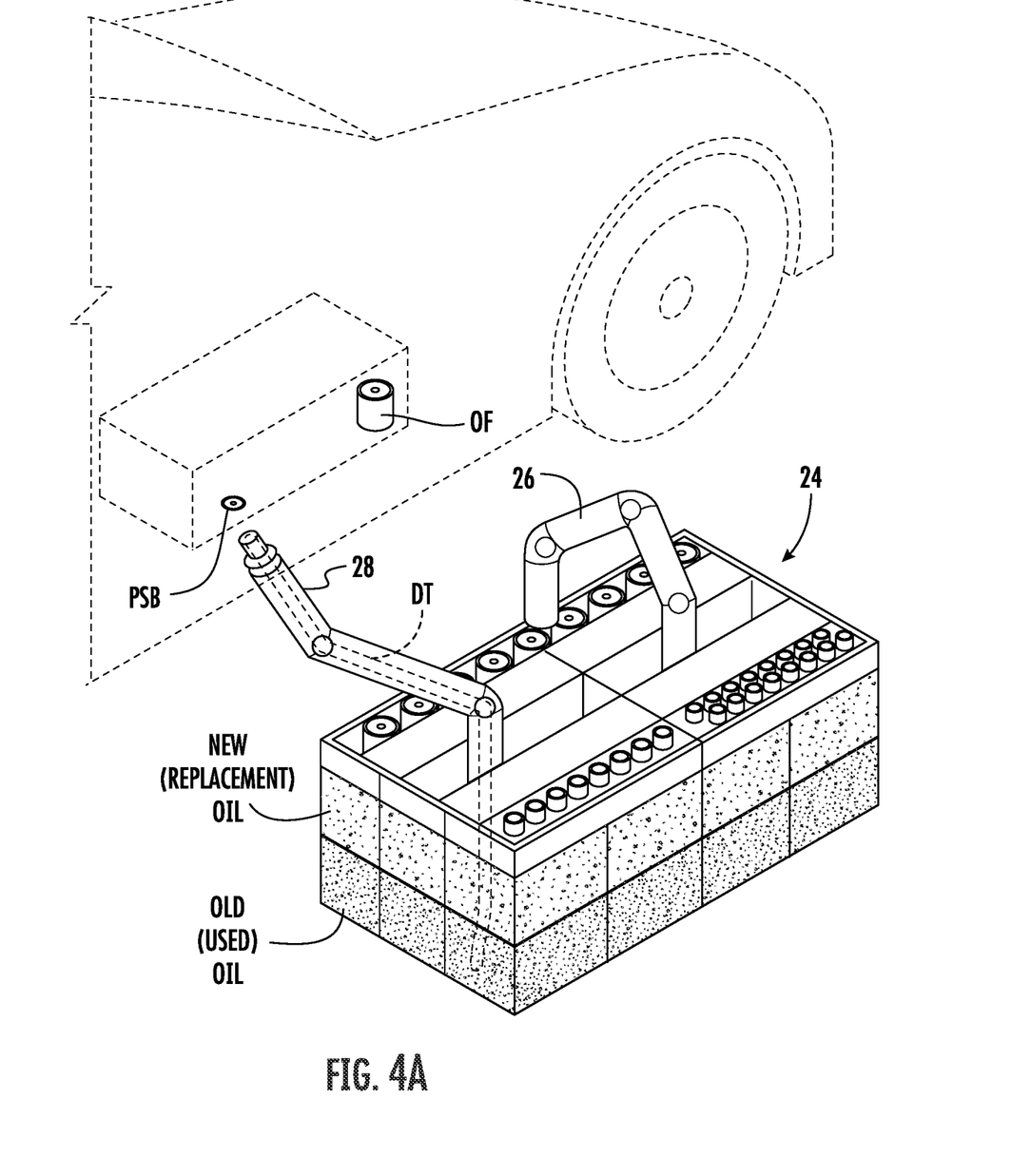
FIG. 4A is a front perspective view of one embodiment of the under-side section of an oil change module for the system of this invention, said module having an articulated oil drainage socket arm, an articulated oil filter arm, and a toolbox consisting of various drainage sockets, oil filters, and storage beneath for both old and new oil fluids.
Figure 4B:
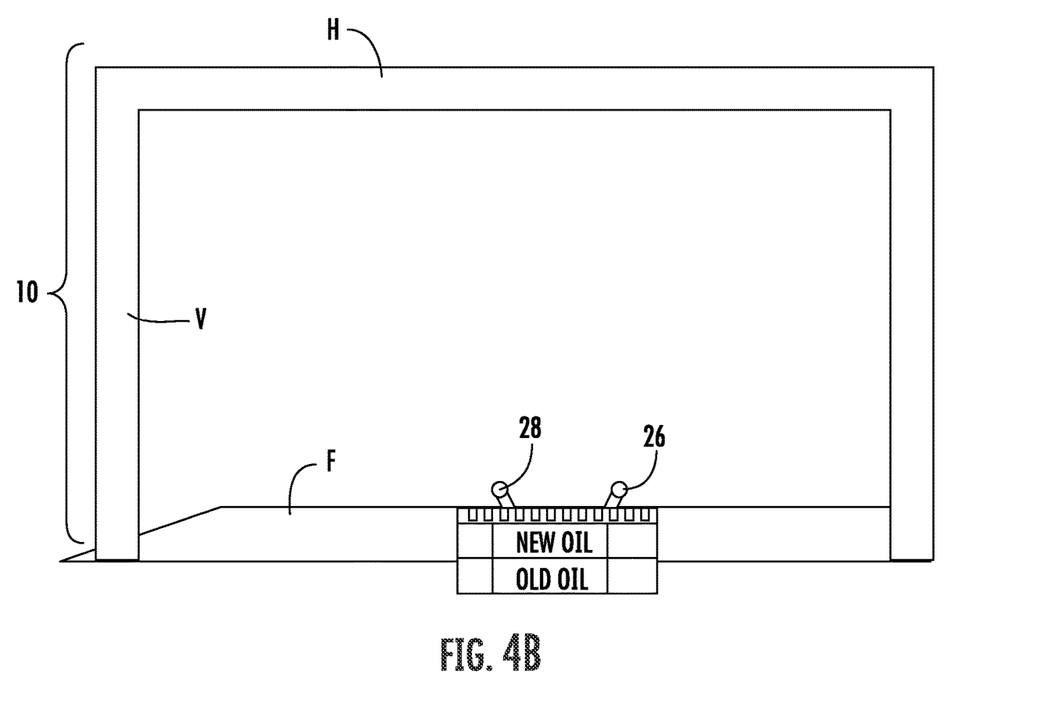
FIG. 4B is a side perspective view showing the Base Unit and a cross section of the oil change module that exists on the underside of a vehicle.
Figure 4C:
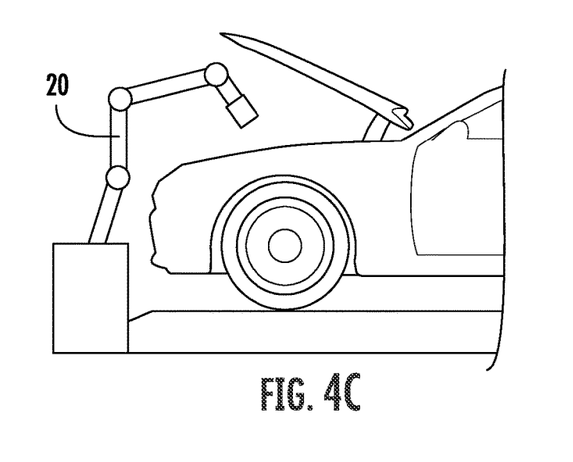
FIG. 4C is a side view of one embodiment of the oil change module arm that is located on the top side of module as it removes the engine oil cap and deposits oil into the engine block of an automobile.

FIGS. 4A, 4B and 4C depict one embodiment of oil change module OCM with its own main upper servicing arm 20. The floor unit component 24 may include additional robotic servicing arms 26, 28 from which a vehicle's oil pan, pan screw bolt PSB and oil filter OF may be accessed using specialized tool heads and machine vision sensors. One or more robotic arms from the oil change module OCM loosens the oil pan bolt and removes the old oil filter through drain tube DT before tightening the pan bolt, installing the new oil filter and refilling the vehicle to manufacturer-prescribed levels with replacement oil. FIG. 4C shows use of a robotic arm 30 (from below) for replacing the oil cap on the manifold of a vehicle engine.

Figure 5A:
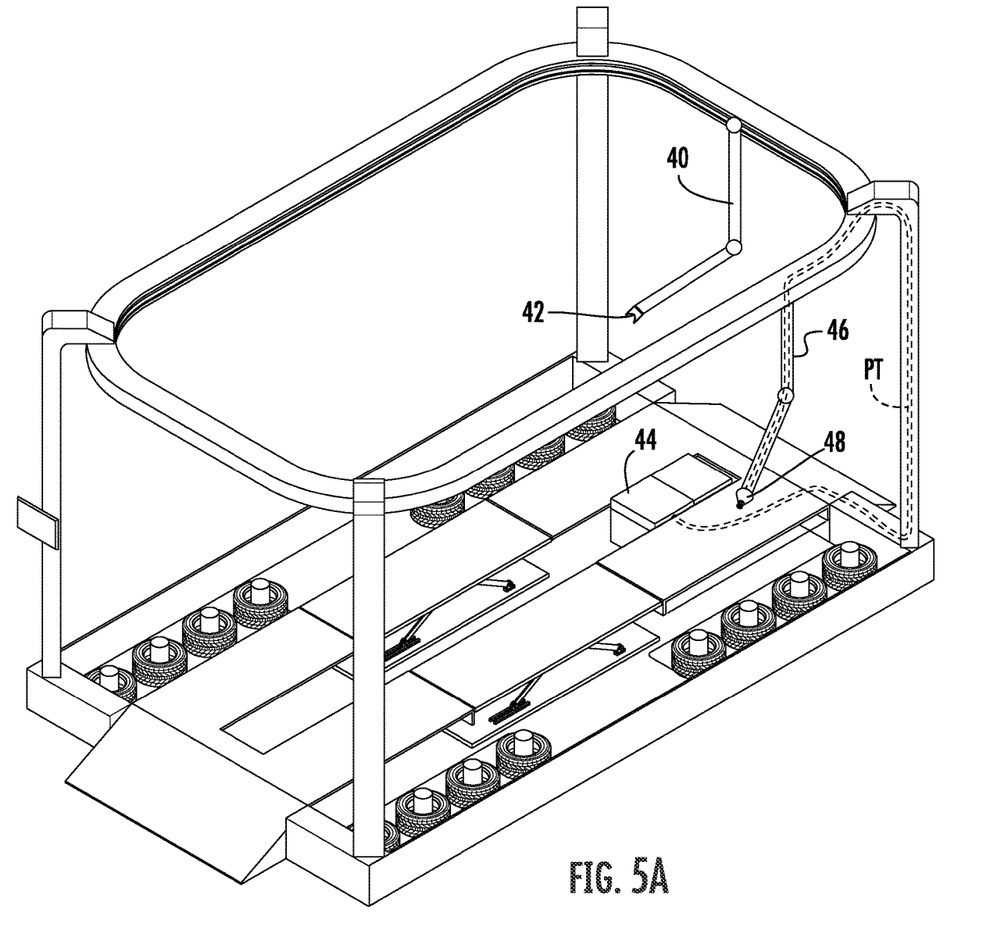
FIG. 5A is a top perspective view showing one embodiment of PAM/CDM module having a sanding arm component from a top extension thereof.
Figure 5B:
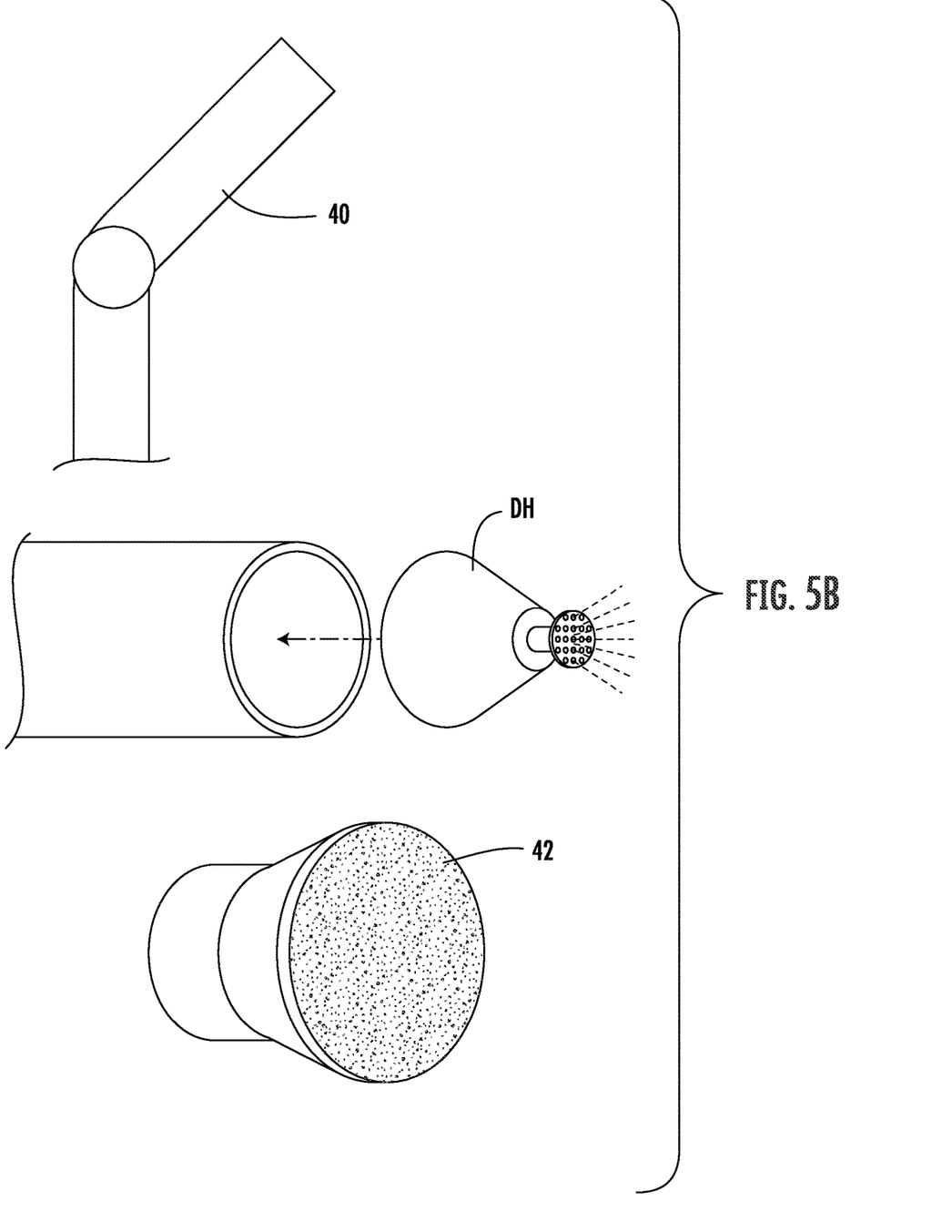
FIG. 5B is a closeup perspective view showing one version of sanding arm extension for a PAM/CDM module, said arm extension having an interchangeable spray tool head, a sander head and a vacuum/heat/dryer head.
Figure 6A:
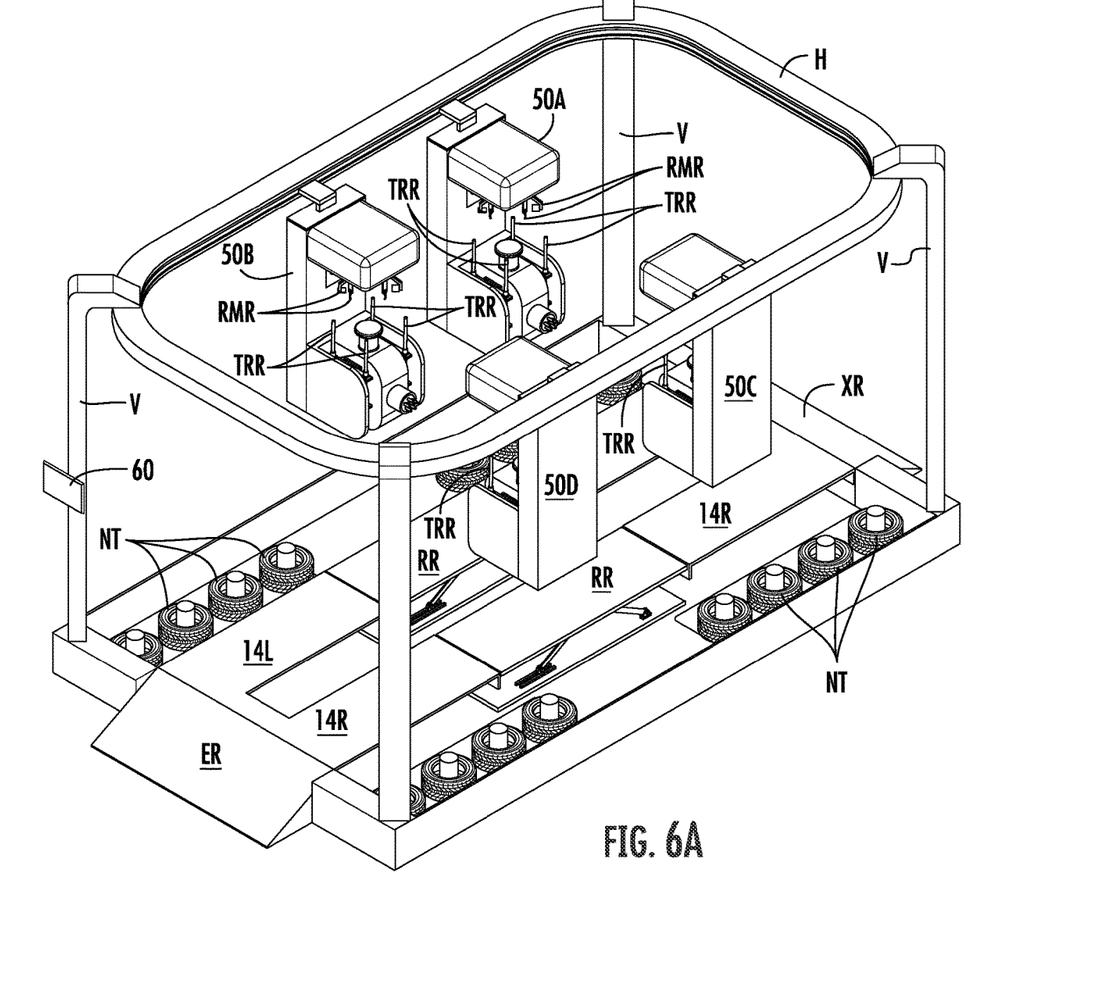
FIG. 6A is a front perspective view of one embodiment of tire control module on its base unit, said tire control module having two separate tire changing modules on either side of a vehicle driven into that base unit, four in total.
Figure 6B:
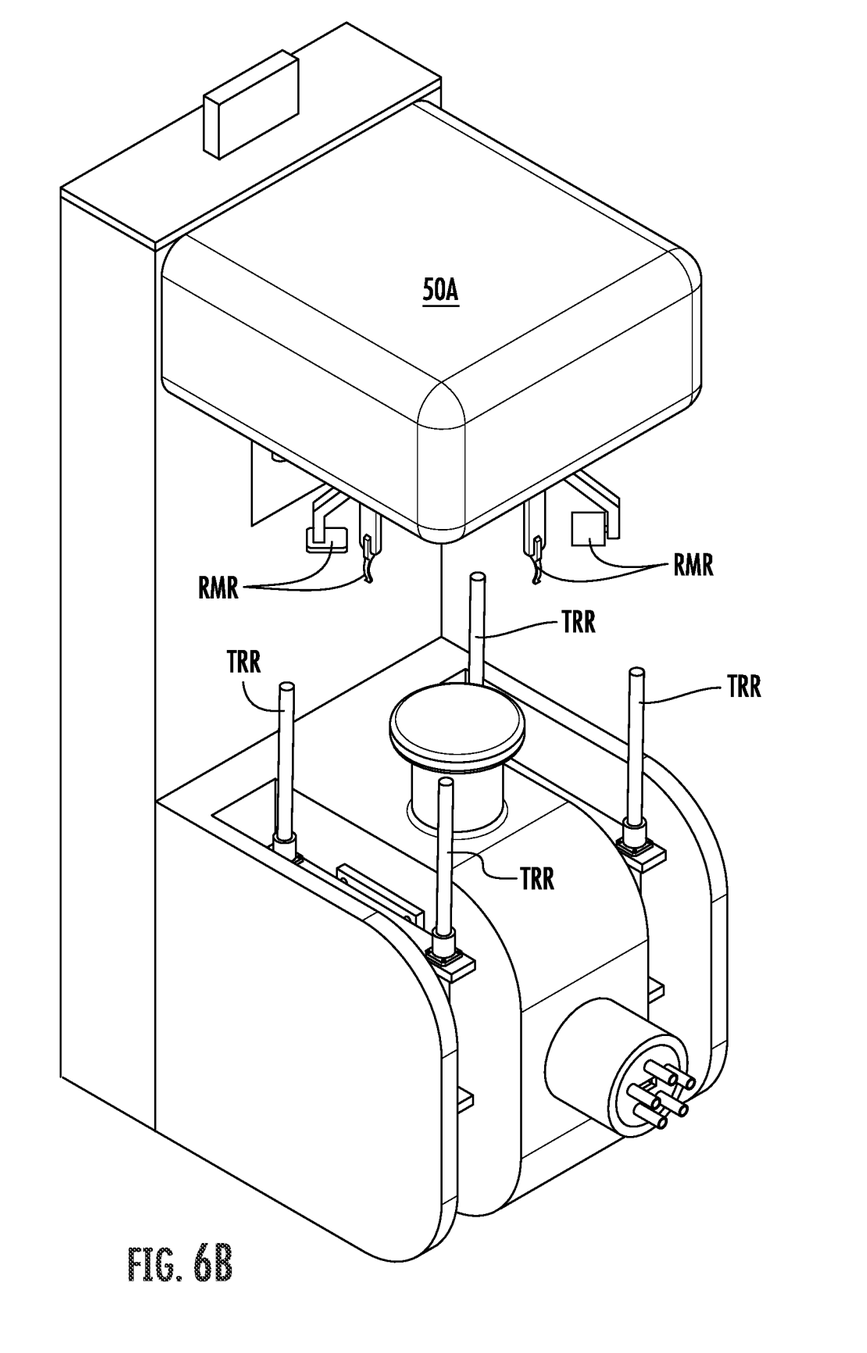
FIG. 6B is a top perspective view showing one representative tire control module.
Figure 6C:
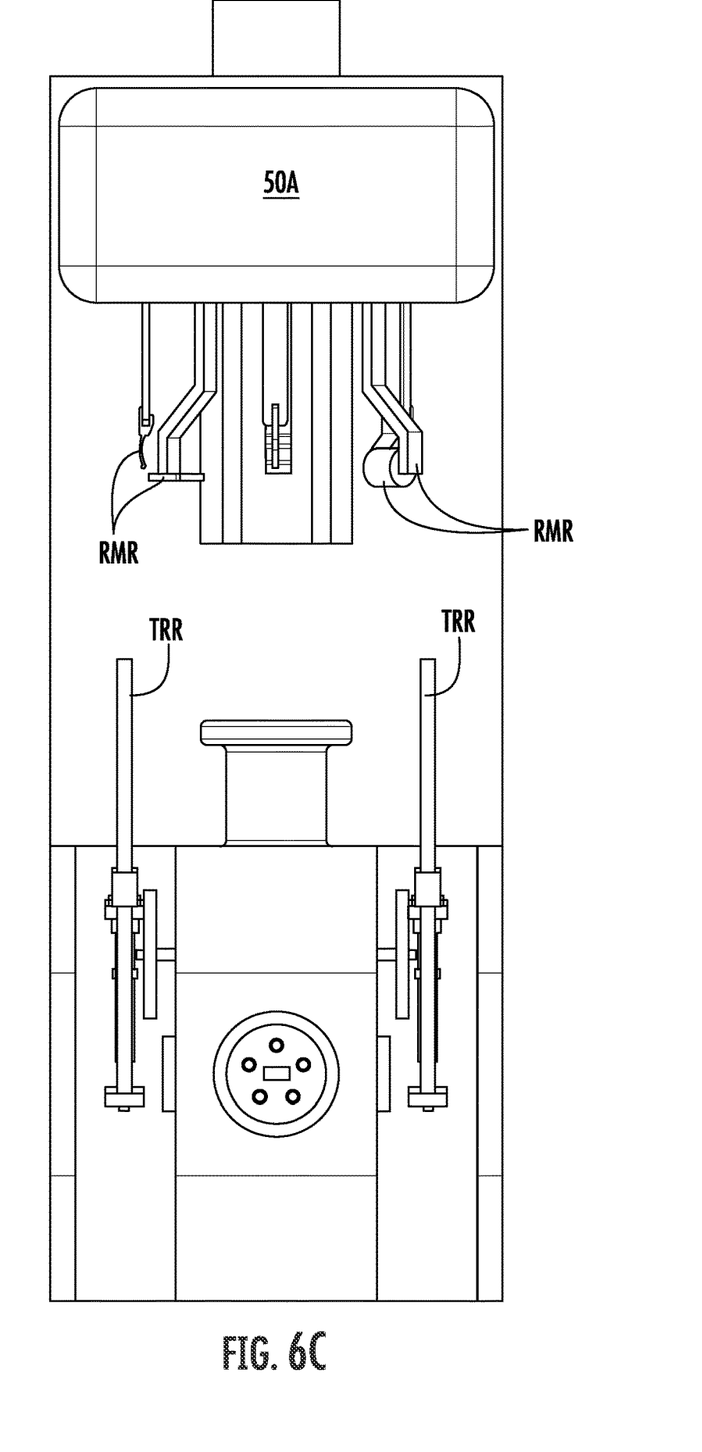
FIG. 6C is a front plan view of the tire control module from FIG. 6B.
Figure 6D:
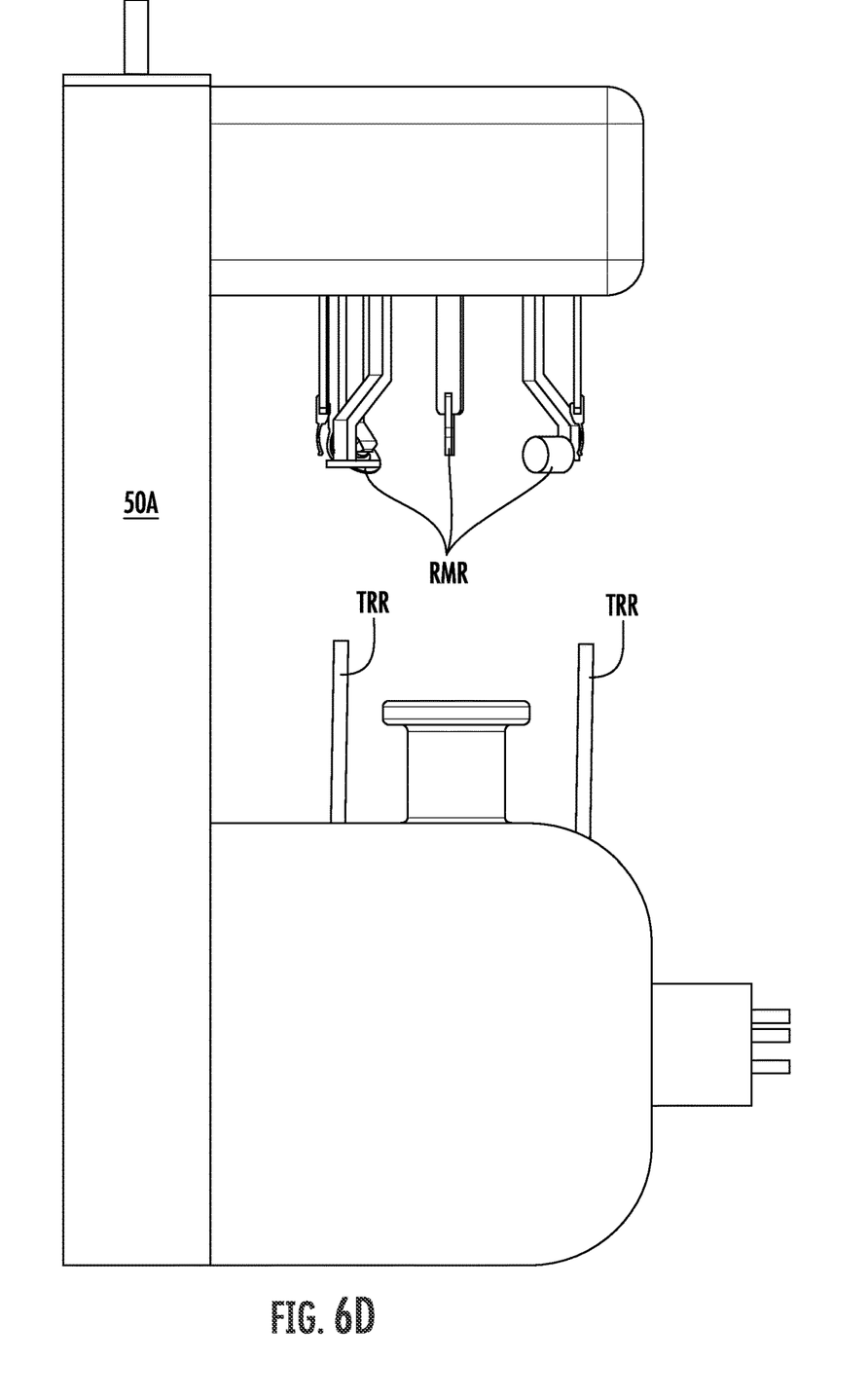
FIG. 6D is a left side plan view of the tire control module from FIGS. 6A and B.
Figure 6E:
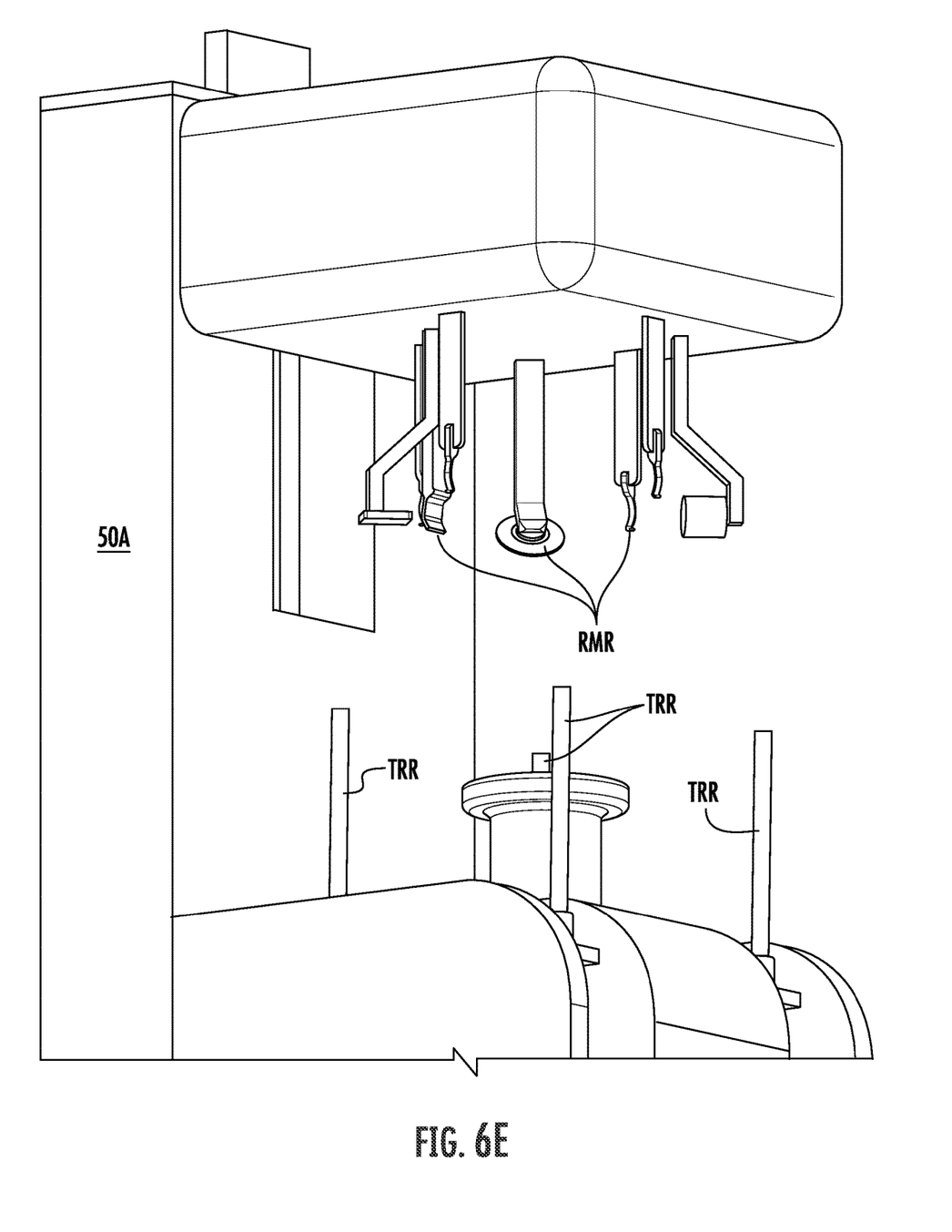
FIG. 6E is a perspective view showing the plurality of tire control module tools extending downwardly from the top end to the representative tire changing station from FIGS. 6A through D.

FIGS. 5A and B focus on one embodiment of PAM/CDM module in which base unit 10 includes a first robotic tool arm 40 extending downwardly from horizontal connector bar H with its own sander/polisher head 42 and a second robotic spray arm 46 for applying paint stored in floor unit 44 through paint tubing PT and spray head 48. A directional heater DH is also shown in FIG. 5B.

FIGS. 6A-E are multiple views of a tire control module TCM that would include machine vision cameras (not shown) to assess the size and positioning of vehicle tire removal rods TRR. These same cameras would be used to assess the configuration, quantity and precise alignment of lug nuts before the lower receiver secures to the mounted tire/rim for removal. After the tire is removed from its vehicle, it would be rotated upwards into place where a plurality of removal mechanism rods RMR separate an existing tire from its rim (neither are shown). The "old" removed tire is then sent to a tire retrieval module where it is stored for recycling and/or disposal. A new tire NT is then retrieved from storage located in the under belly of base unit 10 and transferred to the tire control module where it is put into position for mounting onto the rim. After installation of the tire on the rim has been completed, and inflated, the newly mounted tire/rim combination is transferred back for positioning, installation back onto the vehicle and subsequent balancing.

Still other embodiments may include electronic servicing modules (including battery testing and replacement as needed), major mechanical parts removal/replacement modules, on board vehicle diagnostic ("check engine") modules, user interface/computer modules, fluid replacement modules, and cosmetic detailer modules.

Having described the best modes currently known for practicing this system and method, it is to be understood that the scope of this invention may be further described by the attached claims.

SEQUENCE LISTING

Not applicable.

What is claimed is:

1. A modular system for autonomously performing maintenance or repair services on a vehicle, said system comprising:
   A. a base unit that includes a tubular frame, a vehicle lift, tire balancer, prefabricated hardware slots and a diagnostic tool component; and
   B. one or more of the following module components:
      (i) a tire control module consisting of at least one tire changing station for:
         (a) affixing to the base unit; and
         (b) using the module to:
         remove a first tire mounted on a rim from the vehicle,
         remove the first tire from the rim,
         replace the first tire with a second tire,
         mount the second tire on the rim,
         inflate the second tire on the rim,
         balance the second tire on the rim, and
         mount the balanced second tire and rim onto the vehicle; and
      (ii) an oil change module for affixing to the base unit, said oil change module including:
         (a) a rotating arm for removing: a first oil filter from the vehicle; an oil pan drain plug, and an oil cap from an engine area of the vehicle after its hood has been raised; and grabbing a second oil filter for the vehicle to install;
         (b) an area for collecting used oil drained from the vehicle; and
         (c) means for delivering new oil from a storage area to the engine area;
      (iii) a mechanical parts application module that includes at least one robotic arm having an arm end with interchangeable tool tips from a tool tip storage area; and
      (iv) a paint/cosmetic detailing application module that includes at least one robotic arm having a sanding tip, a polishing tip and a paint spray tip.

2. The modular system of claim 1 wherein the rotating arm of the oil change module further includes one or more lines for delivering replacement oil from the storage area to the engine area.

3. The modular system of claim 1 wherein the mechanical parts application module further includes at least one 3-D printer for making replacement mechanical parts in situ.

4. The modular system of claim 1 wherein the mechanical parts application module is stored in a holding area in the modular system until needed.

5. The modular system of claim 1 wherein the paint/cosmetic detailing application module is stored in a holding area in the modular system until needed.

6. The modular system of claim 1, which further includes a user interface for programing which of the modules will be used on the vehicle driven into the modular system for servicing.

7. The modular system of claim 6 wherein the user interface is affixed to the base unit.

8. A modular system for autonomously performing maintenance or repair services on a vehicle, said system comprising:
   (a) a base unit that includes a tubular frame and a vehicle lift component located between a pair of adjustable vehicle tire tracks;
   (b) a tire control module consisting of at least one tire changing station for: (i) affixing to the base unit; and (ii) using the module to:
      remove a first tire mounted on a rim from the vehicle,
      remove the first tire from the rim,
      replace the first tire with a second tire,
      mount the second tire on the rim,
      inflate the second tire on the rim,
      balance the second tire on the rim, and
      mount the balanced second tire and rim onto the vehicle; and
   (c) an oil change module for affixing to the base unit, said oil change module including:
      (i) a rotating arm for removing: a first oil filter from the vehicle; an oil pan drain plug, and an oil cap from an engine area of the vehicle after its hood has been raised; and grabbing a second oil filter for the vehicle to install;
      (ii) an area for collecting used oil drained from the vehicle; and
      (iii) means for delivering new oil from a storage area to the engine area.

9. The modular system of claim 8 wherein the rotating arm of the oil change module further includes one or more tube lines for delivering replacement oil from the storage area to the engine area.

10. The modular system of claim 8 which further includes:
    a mechanical parts application module that includes at least one robotic arm having an arm end with interchangeable tool tips from a tool tip storage area.

11. The modular system of claim 10 wherein the mechanical parts application module further includes at least one 3-D printer for making replacement mechanical parts in situ.

12. The modular system of claim 8 which further includes:
    a paint/cosmetic detailing application module that includes at least one robotic arm having a sanding tip, a polishing tip and a paint spray tip.

13. The modular system of claim 8 which further includes:
    a user interface for programing which of the modules will be used on the vehicle driven into the modular system for servicing.

14. A method for autonomously performing maintenance or repair services on a vehicle, said method comprising the steps of:
    A. supplying an autonomous system having:
       (i) a base unit that includes a tubular frame and a vehicle lift component between a pair of adjustable vehicle tire tracks; and
       (ii) one or more of the following modules:
          (a) a tire control module consisting of at least one tire changing station for affixing to the base unit; and using the module to:
             remove a first tire mounted on a rim from the vehicle,
             remove the first tire from the rim,
             replace the first tire with a second tire,
             mount the second tire on the rim,
             inflate the second tire on the rim,
             balance the second tire on the rim, and
             mount the balanced second tire and rim onto the vehicle;
          (b) an oil change module for affixing to the base unit, said oil change module including (i) a rotating arm for removing: a first oil filter from the vehicle; an oil pan drain plug, and an oil cap from an engine area of the vehicle after its hood has been raised; and grabbing a second oil filter for the vehicle to install; (ii) an area for collecting used oil drained from the vehicle; and (iii) means for delivering new oil from a storage area to the engine area;
          (c) a mechanical parts application module with at least one robotic arm having an arm end with interchangeable tool tips from a tool tip storage area and
          (d) a paint/cosmetic detailing application module that includes at least one robotic arm having a sanding tip, a polishing tip and a paint applicator tip; and
          (e) a user interface for programing which of the modules will be used on a vehicle driven into the modular system for servicing;
    B. driving the vehicle for servicing into the autonomous system; and
    C. programing the user interface to perform services from the modules on the vehicle.

15. The method of claim 14 wherein the mechanical parts application module further includes at least one 3-D printer for making replacement mechanical parts in situ.

\* \* \* \* \*